(12) United States Patent
Gonzalez et al.

(10) Patent No.: US 6,423,151 B1
(45) Date of Patent: Jul. 23, 2002

(54) REMOVAL OF TOXIC CONTAMINANTS FROM POROUS MATERIAL

(75) Inventors: Luciano A. Gonzalez, Ancaster; Blair F. Sim, Brampton; Henry E. Kowalyk, Burlington; Alexandre Z. Mlynarczyk, Toronto; Nobuyoshi Miura, Etobicoke, all of (CA)

(73) Assignee: Kinectrics Inc. (CA)

( * ) Notice: Subject to any disclaimer, the term of this patent is extended or adjusted under 35 U.S.C. 154(b) by 0 days.

(21) Appl. No.: 09/515,457

(22) Filed: Feb. 29, 2000

(51) Int. Cl.[7] ................................................. B08B 7/04
(52) U.S. Cl. ........................... 134/10; 134/11; 134/19; 134/31; 134/109; 134/137; 210/909
(58) Field of Search ............................... 134/10, 11, 19, 134/31, 109, 137; 210/909

(56) References Cited

U.S. PATENT DOCUMENTS

| | | |
|---|---|---|
| 3,739,791 A | 6/1973 | Fry et al. ...................... 134/157 |
| 4,078,943 A | 3/1978 | Saurenman ................... 134/14 |
| 4,758,420 A | 7/1988 | Knowles ....................... 423/659 |
| 4,826,538 A | 5/1989 | Sanders et al. ................ 134/1 |
| 4,983,222 A | 1/1991 | Green et al. ................. 134/22.1 |
| 4,988,391 A | 1/1991 | von Bormann ............ 134/25.5 |
| 5,203,359 A | 4/1993 | Fesmire et al. ................ 134/61 |
| 5,279,747 A | * 1/1994 | Chu ........................... 210/751 |
| 5,434,332 A | * 7/1995 | Cash ............................. 588/1 |
| 5,577,522 A | * 11/1996 | Barkley et al. ............. 134/111 |
| 5,704,557 A | * 1/1998 | Hallett et al. ................ 241/123 |

* cited by examiner

Primary Examiner—Frankie L. Stinson
Assistant Examiner—Michael Kornakov
(74) Attorney, Agent, or Firm—Marshall, Gerstein & Borun

(57) ABSTRACT

A method and apparatus for removing a toxic contaminant from porous material by placing the material and a fluid solvent for the toxic in a drum and rotating the drum around its horizontal axis. Also provided is apparatus for placing the drum in a sealable container and sealing the container during the decontamination cycle.

31 Claims, 2 Drawing Sheets

REMOVAL OF TOXIC CONTAMINANTS FROM POROUS MATERIAL

FIELD OF THE INVENTION

This invention relates to removing contaminants from porous material, and more particularly to removing PCB from porous material, such as wood, paper and polymeric membranes used in the construction of electrical equipment.

BACKGROUND OF THE INVENTION

Electrical insulating fluids that contain polychlorinated biphenyl (PCB) were once used frequently in electrical transformers, choke coils and capacitors. However, it has been found that these PCB-containing insulating fluids are physiologically and environmentally dangerous, so that the transformers, choke coils and capacitors must be replaced with apparatus that do not contain environmentally harmful insulating fluids. In order to eliminate unusable PCB-containing insulating fluid and PCB-saturated or PCB-moistened solid materials, strict regulations are in effect. For example, many jurisdictions have regulations which only permit destruction in an officially authorized incinerator or storage in an officially authorized hazardous waste dump. In order to minimize this expensive type of disposal elimination, it is desirable for the component parts of the electrical apparatus to be cleaned of PCB to such an extent that they have a PCB content below the maximum set by official regulations.

As is known on the prior art, reducing the level of PCB compounds to a nonhazardous level in a material includes (a) contacting the PCB compound-containing material with an extraction solvent at a temperature and for a time sufficient to remove the absorbed PCB compound; and (b) separating the PCB compound-containing extraction solvent from the material.

U.S. Pat. No. 4,983,222 to Green et al, U.S. Pat. No. 5,203,359 to Fesmire et al and U.S. Pat. No. 4,988,391 to von Bormann, all teach the use of agitation of the material in solvent for decontaminating materials. However, Green et al, Fesmire et al, and von Bormann all teach methods for removing contaminants from non-porous materials only, and that porous material is to be disposed of.

It is particularly difficult to clean the solid porous insulating parts of electrical apparatus. Such insulating substances are formed of insulating paper, insulating press board, resin bonded paper, resin bonded fabric, insulating wood, polypropylene or other polymeric membranes, or synthetic-resin-bonded compressed wood. Since the insulating parts are in contact with the insulating fluid in an electrical appliance, the pores of these insulating parts are thoroughly saturated with PCB-containing insulating medium. Rinsing these insulating substances with a solvent for PCB cannot substantially remove the insulating fluid from deep within the insulating parts, instead it can only clean the surface thereof.

The prior art teaches methods for decontaminating porous materials which are contaminated with various substances, such as PCB. U.S. Pat. No. 4,826,538 to Sanders et al teaches filling and draining with a cleaning solvent repeatedly and agitating the porous material in solution, including rotation around a vertical axis of the porous material in solution, until the desired level of decontamination is obtained. U.S. Pat. No. 3,739,791 to Fry et al also teaches a system for decontaminating various articles which includes rotation about a vertical axis.

SUMMARY OF THE INVENTION

The invention provides a method for removing a toxic contaminant from porous material comprising the steps of:

(a) placing the material in a drum having a horizontal axis; (b) placing a fluid solvent for the toxic contaminant in the drum; (c) rotating the drum around the horizontal axis for a period of time sufficient for a quantity of the toxic contaminant to mix with the solvent; and (d) subsequently removing the fluid solvent from the drum. The cycle may be repeated until assessment of the quantity of toxic contaminant indicates that a desired quantity of toxic contaminant is obtained. Preferably, the contaminant is a PCB. Preferably, the solvent is selected from the group consisting of n-hexane, xylene, perchloroethylene, tetrachloroethylene, trichlorofluoroethane or any other solvent from the hydrofluoroether family. Preferably, the porous material is selected from the group consisting of electrical insulation materials, soil, sand, natural polymeric materials and synthetic polymeric materials.

Preferred conditions for the invention include a rotation period of 20 to 30 minutes at a speed of between 1 and 10 rotations per minute, and/or heating the solvent from the ambient temperature to a final temperature from 20 to 50 C. below the boiling temperature of the solvent.

In a preferred embodiment, the invention also contemplates placing the drum in a sealable container and sealing the container subsequent to step (a) and prior to step (b). The present invention also teaches apparatus for carrying out this preferred embodiment, including: a cart containing the drum; a sealable container having a wall and having a door for receiving the cart in the sealable container; fill and drain tubes passing through the wall of the sealable container, the fill and drain tubes capable of releasably attaching to the drum, for filling the drum with solvent and for draining the solvent from the drum; and a motor for rotating the drum and a power generator for supplying power to the motor. Preferably, the motor is located on the cart. Preferably, the power generator is located outside of the sealable container.

In a preferred embodiment, the invention also contemplates a track for receiving and removing the cart from the sealable container. In a further preferred embodiment, a portion of the track which extends beyond the interior of the container is removable.

DESCRIPTION OF PREFERRED EMBODIMENTS

Figure 1:
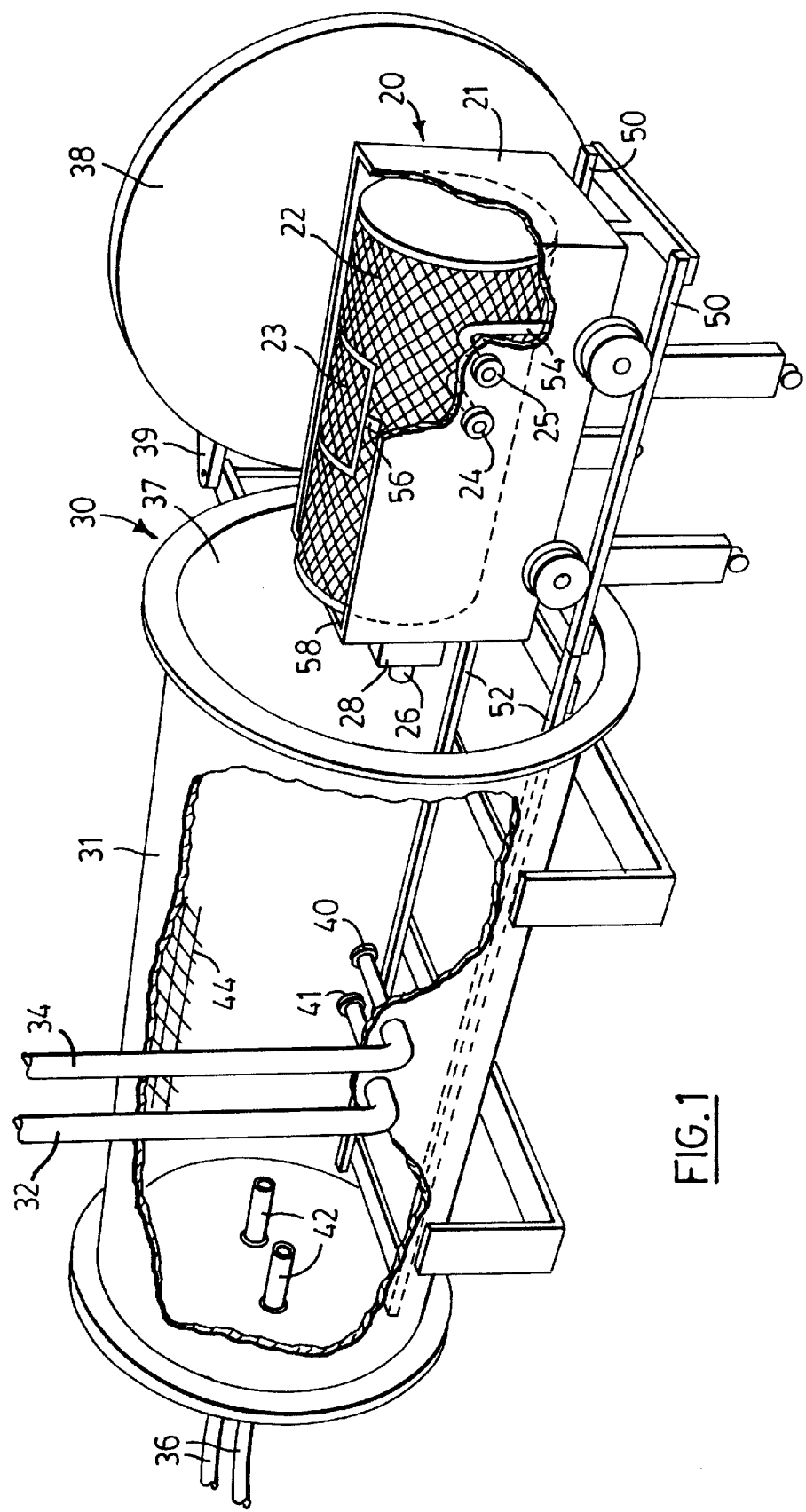
FIG. 1 is a perspective partially broken away view of an embodiment of the invention.

The present inventors have developed and built a solvent extraction process and apparatus for the removal of toxic contaminants from porous materials. The invention will be described as it applies to the decontamination of PCB laden porous insulation from electrical capacitors and electrical transformers. It will be appreciated that the invention has application to a variety of decontamination processes and apparatus, and in particular, decontamination of toxin-containing insulating fluids which are physiologically or environmentally dangerous.

In the present invention, the solid material is agitated with the solvent by means of rotation about a horizontal axis, in order to produce a tumbling of the porous material within the solvent. The solvent is thus efficiently and effectively mixed into the porous material and then the solvent is drained off. This cycle may be repeated a number of times.

The process uses a wheeled cart on which is supported a drum that is rotatable on the cart by a hydraulic motor also mounted on the cart. The drum is half filled with contaminated porous material. The cart is wheeled inside a sealable container. Fill and drain lines are connected to the drum, and hydraulic lines are connected to the hydraulic motor. These fill, drain and hydraulic lines pass through the wall of the sealed container. Solvent is run into the drum to half fill the drum, and hydraulic fluid is passed to the motor to rotate the drum and tumble the porous material in the solvent. The drum may be drained and re-filled a number of times until analysis of the drained solvent indicates that the level of contaminant has been reduced to the desired level. After draining the solvent, the porous material is subjected to a drying stage. Upon completion of the drying stage, the lines are disconnected, the container is opened, and the cart wheeled out so that the cleaned material can be removed from the drum for disposal or possible recycling.

"Porous", as used herein, refers to any material which will absorb and retain the toxic compounds contemplated herein. Porous materials include, for example, various insulation materials, soil, sand, and natural and synthetic polymeric materials. Polymeric materials, such as vinyl ester resins (e.g., DERAKANE™), paper, clothing, plastics or the like, normally coarsely divided, for example, in shredded form, are preferred in the present invention.

"Solvent", as used herein, refers to any extraction solvent suitable for extracting toxic compounds contemplated herein such as PCB or like compounds, and includes methylene chloride, chloroform, carbon tetrachloride, trichloroethane, methylchloroform, tetrachloroethane, pentachloroethane, trichloroethylene, perchloroethylene, benzene, toluene, xylene, acetone, methyl ethyl ketone, hydrofluoroethers, or mixtures thereof.

"PCB", as used herein, refers to any PCB or PCB-like compound, including, for example, polychlorinated biphenyls, hexachloroethane, hexachlorobutadiene, hexachlorobenzene or mixtures thereof.

As shown in FIG. 1, the apparatus of the invention comprises an autoclave or vessel 30 and a cart 20. Cart 20 has cart walls 21 which form a chamber 58 containing a perforated basket 22. Basket 22 has a basket door 23, suitable for loading and unloading porous materials. When closed, basket door 23 may be secured by means of a latch 56. Cart 20 has attached thereto cart solvent couplings 24 and 25, cart hydraulic couplings 26 (only one of two shown), and hydraulic motor 28. Cart solvent drain coupling 25 is in flow communication with the bottom of chamber 58 through tube 54. Cart solvent feed coupling 24 is in flow communication with chamber 58 of cart 20. Cart hydraulic couplings 26 are in flow communication with hydraulic motor 28. Hydraulic motor 28 is in rotational mechanical communication with basket 22.

Couplings 40, 41, 42, 24, 25 and 26 are preferably standard one inch (2.4 cm) quick disconnect couplings. Such couplings provide for instantaneous shut-off from inlet and outlet valves when disconnected. Solvent line connections through autoclave wall 31 or cart wall 21 may be made of black carbon steel pipe, using threaded fittings and a chemically resistant compound as thread sealant. A spill tray can be placed under solvent lines 32 and 34 near the couplings 40, 41, 24 and 25 to collect any drips during hose connection and disconnection. A turn of each line is coiled into the spill tray to direct any leakage. Gear pumps with pressure bypass (not shown) are used to transfer the liquids in the decontamination system. Design and engineering of the system prevents cross contamination of PCB and PCB free lines.

Autoclave 30 has autoclave wall 31, autoclave door 38 and autoclave opening 37. Opening 37 is suitable for loading and unloading cart 20. Autoclave door 38 is attached to the autoclave 30 by means of hinge 39, and door 38 suitable for sealing the autoclave opening 37.

Autoclave 30 also has hydraulic lines 36 and solvent lines 32 and 34 passing through autoclave wall 31. External to the autoclave 30, the hydraulic lines 36 are in flow communication with a hydraulic generator 80 of FIG. 2. Also external to the autoclave 30, solvent feed line 32 is in flow communication with a clean solvent holding tank 66 of FIG. 2, and the solvent drain line 34 is in flow communication with second holding tank 70 of FIG. 2. As shown in FIG. 1, inside autoclave 30, hydraulic lines 36 terminate in hydraulic line couplings 42, and solvent lines 32 and 34 terminate in solvent line couplings 40 and 41.

Autoclave track 52 extends to autoclave opening 37, and is suitable for facilitating the placement and removal of cart 20 within autoclave 30. Removable track 50, which is external to autoclave 38, may be aligned with autoclave track 52 at opening 37 when the door 38 is open, to facilitate the placement or removal of cart 20. Removable tracks 50 may be removed to facilitate the closing of door 38.

When cart 20 is placed in autoclave 30, hydraulic line couplings 42 are releasably connectable to cart hydraulic line couplings 26, solvent drain coupling 40 is releasably connectable to cart drain coupling 25, and solvent feed coupling 41 is releasably connectable to cart feed coupling 24. When connected, hydraulic line couplings 42 are in flow communication with cart hydraulic line couplings 26, solvent drain coupling 40 is in flow communication with cart drain coupling 25, and solvent feed coupling 41 is in flow communication with cart feed coupling 24.

Figure 2:
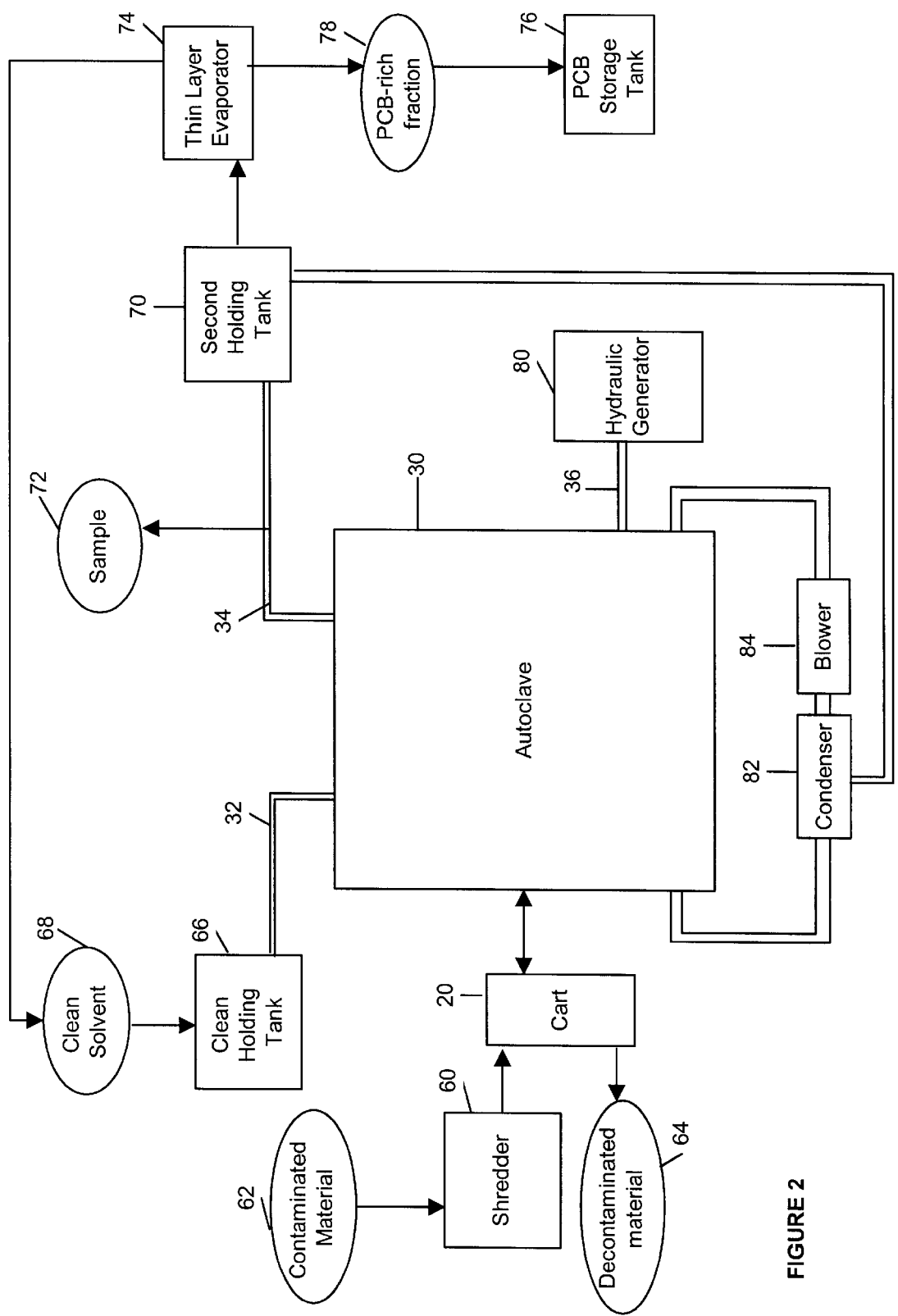
FIG. 2 is a schematic diagram of the methods of an embodiment of the invention.

In use, having regard to FIGS. 1 and 2, PCB contaminated porous material 62, for example, PCB capacitor core insulation material, is granulated by feeding the material into a shredder or granulator 60. After passing through granulator 60, the contaminated material 62 is placed into a perforated metal basket 22 inside the decontamination cart 20. Once basket 22 is full, cart 20 is placed inside the autoclave 30. After connecting the solvent feed coupling 41 to cart feed coupling 24, solvent drain coupling 40 to cart drain coupling 25, and the hydraulic line couplings 42 to cart hydraulic couplings 26, the door 38 of the autoclave 30 is closed by means of hinge 39 and sealed, and the unit is ready to initiate a decontamination cycle.

Clean solvent 68, for example, perchloroethylene, is pumped from a holding tank 66 through solvent feed 32 into the decontamination cart 20. After loading the desired volume of solvent 68, the hydraulic motor is started and the rotation of basket 22 thus initiated. In preferred embodiments, the volume of solvent is enough to raise the level of solvent to half the height of basket 22. Because basket 22 is perforated, solvent flows through the basket 22 and contacts freely with the porous material. Mixing the porous material via tumbling of basket 22 in the solvent increases the rate of decontamination of the material.

Once the distribution of PCB in the contaminated core and the extracting solvent has reached equilibrium (for example, after 20 to 30 minutes of mixing), the rotation of basket 22 maybe stopped and the solvent now contaminated with PCB is drained. The PCB contaminated solvent is then transferred through solvent drain line 34 to a second holding tank 70, fresh solvent is subsequently reloaded into the decontamination vessel through solvent feed line 32, and the rotation of the basket is re-initiated. To determine the extraction efficiency of the cycle, a sample 72 of the extracting solvent is taken and analyzed. The PCB extraction process is repeated until analysis of the extracting solvent sample 72 indicates that the decontamination of the material has reached the desired level (generally less than 50 ppm).

The extraction process can be accelerated by increasing the temperature of the extracting mixture. Any suitable means of providing heat to the solvent extraction process may be used. In one embodiment, the autoclave unit 30 contains electrical heaters 44 that can be used to heat the system once it is loaded with the contaminated material and the extracting solvent, allowing the temperature to arise to the desired level. As another alternative, hot solvent from the solvent recovery system may be fed directly into the cart 20.

Once the decontamination of the porous material is completed, the cart 20 is drained for the last time and the decontaminated porous material 64 inside basket 22 is ready to be dried. The PCB laden solvent may be cleaned and reclaimed using, for example, thin layer evaporator 74, as follows. The PCB laden solvent is fed at the top of the evaporator 74. Gravity and the rotary axis in the unit allow a homogenous distribution of the contaminated solvent. As hot fluid is fed through the jacket of the evaporator, the solvent is evaporated in the center of the unit and moves upward towards the condenser. The solvent vapor is collected at the bottom of the condenser and periodically pumped into the clean holding tank 66. The PCB-rich Faction 78 is collected at the bottom of the evaporator 74 and periodically pumped into the PCB storage tank 76. A vacuum pump (not shown) is attached to the top of the condenser, so the evaporation system can be carried out at a reduced pressure and at a lower temperature.

The PCB contaminated solvent that results from this decontamination process is reclaimed and reused in the process. High-level PCB liquid waste segregated during the reclamation of the decontaminating solvent is disposed of through any approved PCB destruction process.

Porous material in cart 20, soaked in solvent, is preferably subjected to a drying stage before opening the autoclave 30. To dry the material, heaters 44 in autoclave 30 are turned on and air is forced to circulate by means of blower 84 through autoclave 30 and solvent condensing unit 82. This can be done in a closed loop. Solvent collected in condensing unit 82 is subsequently stored in holding tank 70. The drying stage is continued until the collection of solvent in the condensing unit is reduced to a few milliliter per minute, indicating that the amount of residual solvent in the porous material is negligible.

Upon completion of the drying stage, the autoclave door 37 is opened and the cart 20 is removed from the autoclave 30. Once the cart 20 is outside the autoclave 30, the door 23 from the basket 22 is opened and samples of the material are taken for analysis. If the analysis confirms the decontamination level meets the regulatory standard, the material is removed from the system and declared decontaminated. However, if the PCB level in the material is above the target, the loaded cart 20 is placed back into autoclave 30 and the solvent extraction procedure extended. The draining, drying and analytical procedures are repeated until confirmation of the target decontamination level for the porous material has been met.

To determine the extraction efficiency of the process of the invention, US EPA Method No. 3540-B, Soxhlet Extraction Method for Extracting PCB from Porous Materials, was followed. Compliance with decontamination targets for the decontaminated shredded porous material 64 is thus ensured. The Soxhlet method ensures intimate contact of the sample matrix with the extracting solvent and allows for the quantitative separation of PCB and other water insoluble organic compounds from solid samples. In summary, the material sample is mixed with anhydrous sodium sulphate, placed in an extraction thimble and extracted using an appropriate solvent in a Soxhlet extraction apparatus. The extract is then dried, concentrated (if required), and, as necessary, exchanged into a solvent compatible with the clean up and quantitative steps to be followed. The specific cleanup procedure used will depend on the nature of the sample to be analyzed and the data quality objectives for the measurements. General guidance for sample extract cleanup is provide in US EPA Method 3600. Analysis may be carried out using US EPA Method 8081 Analytical Method.

EXAMPLE

This example sets out performance characteristics of the present invention in removing PCB from PCB contaminated capacitor insulation.

Input Materials
  Porous Material: 738 kg
  Decontaminating Solvent: 10,000 kg (to be reclaimed and reused in batch)

Output Materials
  Porous Materials: 738 kg
  Decontaminating Solvent: 9,800 kg*
  Liquid PCB (in unrecovered solvent): 150 kg
  * In this example, the decontaminating solvent was also used in the spray cleaning of non-porous materials.

The invention thus provides a method for removing toxic contaminants from porous materials, which overcomes the disadvantages of methods known in the art and which permits a simple, cost-effective removal of PCB-containing insulating fluids from the pores of such insulating substances. In particular, the contaminants can be removed not only from the regions of porous materials that are located close to the surface, but the regions of the porous materials located deep within them are also cleaned.

The invention achieves a significant benefit over the prior art methods by eliminating channeling of the solvent through a stagnant material as in prior art. In contrast, there is a dynamic and thorough mixing of the material and the solvent, accelerating the transfer of the toxic contaminant from the material into the solvent phase.

The invention achieves several other benefits over the prior art methods. For example, by the teachings of the prior art, the drum containing the contaminated porous material is rotated around a vertical axis. Consequently, in order for all the contaminated material to come into contact with the cleaning solution, the drum must be completely filled with solvent. In contrast, the present invention need only be partially filled with solvent; the contaminated material will be immersed in the solvent repeatedly in the course of the tumbling. Secondly, when materials are rotated around a vertical axis in a drum, those materials will tend to move to the sides of the drum and remain there, thereby reducing the effective mixing of solvent and material. Some prior art methods address this problem by introducing a second agitating movement, namely a piston-like vertical movement. By the present invention, a secondary agitation movement is not necessary because the tumbling affect will keep the contaminated materials in constant motion. Hence, additional benefits over the prior art are simplified mechanical apparatus and greater energy efficiency.

The present invention also teaches benefits over the prior art in the use of the autoclave and cart system. The apparatus of the present invention allows for the decontamination cycle, and indeed, for multiple sequential decontamination cycles to occur inside a sealed chamber, isolated from personnel and from the environment external to the autoclave. This provides significant safety benefits when removing contaminants which are physiologically and environmentally hazardous.

The present invention also teaches further benefits over the prior art in the use of a cart. The apparatus taught by the prior art comprise baskets which cannot be readily moved in and out of the sealed container to an alternate container when moving the porous contaminated material to another location. In contrast, by the use of the cart of the present invention in conjunction with the releasable solvent and hydraulic lines passing through the wall of the sealed container, the cart or the drum containing the contaminated materials may be readily transported to another location without direct handling of the contaminated materials.

The use of cart and basket also allows a fast and efficient separation of the solvent from the material during the draining stage. Maximum separation of the solvent is desired at the end of each extracting stage to reduce the number of extracting stages required to reach the decontamination target.

Maximum separation of the solvent is also desired to reduce the time required to remove residual solvent from the solid material during the final drying stage.

Although preferred embodiments of the invention have been disclosed for illustrative purposes, it will be appreciated that variations or modifications of the disclosed apparatus lie within the scope of the present embodiments.

We claim:

1. A method for removing toxic contaminant from porous material comprising the steps of:
    (a) placing said material in a drum having a horizontal axis, the drum being disposed in a cart;
    (b) placing said cart and drum in a sealable container and sealing said container;
    (c) placing a fluid solvent for said toxic contaminant in said cart to partially fill said cart, the drum being at least partially submerged in said fluid solvent, said fluid solvent being a non-aqueous solvent;
    (d) rotating said drum around said horizontal axis for a period of time sufficient for a quantity of said toxic contaminant to mix with said solvent; and
    (e) subsequently removing said fluid solvent from said drum.

2. A method as claimed in claim 1 wherein said contaminant is a polychlorinated biphenyl (PCB).

3. A method as claimed in claim 2 wherein said solvent is a hydrofluoroether or a mixture of hydrofluoroethers.

4. A method as claimed in claim 3 wherein said solvent is selected from the group consisting of tetrachloroethylene, trichlorofluoroethane or mixtures thereof.

5. A method as claimed in claim 1 wherein said porous material is selected from the group consisting of electrical insulation materials, soil, sand, natural polymeric materials and synthetic polymeric materials.

6. A method as claimed in claim 1 wherein said porous material is selected from the group consisting of vinyl ester resins, paper, clothing, plastics, insulating paper, insulating press board, resin bonded paper, resin bonded fabric, insulating wood and synthetic-resin-bonded compressed wood.

7. A method as claimed in claim 1 wherein said rotation is for a period of 20 to 30 minutes at a speed of between 1 and 10 rotations per minute.

8. A method as claimed in claim 1, further comprising heating said solvent from the ambient temperature to a final temperature from 20 to 50° C. below the boiling temperature of the solvent.

9. A method as claimed in claim 1, further comprising, subsequent to the step (e), assessing the quantity of toxic contaminant in the solvent removed from said drum.

10. A method as claimed in claim 9, further comprising repeating the steps (b), (c), (d) and (e) subsequent to the step (e), until said assessment of the quantity of toxic contaminant indicates that a desired quantity of toxic contaminant is obtained.

11. A method as claimed in claim 1, further comprising the step of shredding said material prior to placing said material in said drum.

12. A method as claimed in claim 1, further comprising, subsequent to step (e), treating said solvent in a thin layer evaporator to separate solvent from contaminant.

13. A method as claimed in claim 12, further comprising the step of reusing said treated solvent in said drum.

14. A method as claimed in claim 1, further comprising the removal of residual solvent from said material by evaporation in a closed loop subsequent to step (e).

15. A method for removing a toxic contaminant from porous material comprising the steps of:
    (a) providing a perforate drum horizontally disposed in a movable cart;
    (b) placing said material in said drum;
    (c) moving said cart, with said cart and said material disposed therein, into a sealable container and sealing said container;
    (d) placing a fluid solvent for said toxic contaminant in said cart to partially fill said cart, said drum being at least partially submerged in said fluid solvent, said fluid solvent being a non-aqueous solvent;
    (e) rotating said drum around said horizontal axis for a period of time sufficient for a quantity of said toxic contaminant to mix with said solvent; and
    (f) subsequently removing said fluid solvent from said drum.

16. A method as claimed in claim 15 wherein said contaminant is a polychlorinated biphenyl (PCB).

17. A method as claimed in claim 16 wherein said solvent is a hydrofluoroether or a mixture of hydrofluoroethers.

18. A method as claimed in claim 17 wherein said solvent is selected from the group consisting of tetrachloroethylene, trichlorofluoroethane or mixtures thereof.

19. A method as claimed in claim 15 wherein said porous material is selected from the group consisting of electrical insulation materials, soil, sand, natural polymeric materials and synthetic polymeric materials.

20. A method as claimed in claim 15 wherein said porous material is selected from the group consisting of vinyl ester resins, paper, clothing, plastics, insulating paper, insulating press board, resin bonded paper, resin bonded fabric, insulating wood and synthetic-resin-bonded compressed wood.

21. A method as claimed in claim 15 wherein said rotating is for a period of 20 to 30 minutes at a speed of between 1 and 10 rotations per minute.

22. A method as claimed in claim 21 wherein said rotating is performed hydraulically.

23. A method as claimed in claim 15, further comprising heating said solvent from the ambient temperature to a final temperature from about 20 to about 50° C below the boiling temperature of the solvent.

24. A method as claimed in claim 15, further comprising subsequent to the step (f), assessing the quantity of toxic contaminant in the solvent removed from said drum.

25. A method as claimed in claim 24, further comprising repeating the steps (c), (d), (e) and (f) subsequent to the step (f), until said assessment of the quantity of toxic contaminant indicates that a desired quantity of toxic contaminant is obtained.

26. A method as claimed in claim 15, further comprising the step of shredding said material prior to placing said material in said drum.

27. A method as claimed in claim 15, further comprising, subsequent to step (f), treating said solvent in a thin layer evaporator to separate solvent from contaminant.

28. A method as claimed in claim 27, further comprising the step of reusing said treated solvent in said drum.

29. A method as claimed in claim 15, further comprising the removal of residual solvent from said material by evaporation in a closed loop subsequent to step (f).

30. A method as claimed in claim 15 wherein the cart includes an open top for inserting and removing the drum.

31. A method as claimed in claim 15 wherein said placing of said fluid solvent and said removing of said fluid solvent comprises pumping said fluid solvent through a plurality of conduits that pass through the container and the cart.

* * * * *